June 13, 1933.  E. S. SKINDZIER  1,913,640
CHART
Filed Sept. 3, 1932  5 Sheets-Sheet 2

June 13, 1933.  E. S. SKINDZIER  1,913,640
CHART
Filed Sept. 3, 1932  5 Sheets-Sheet 3
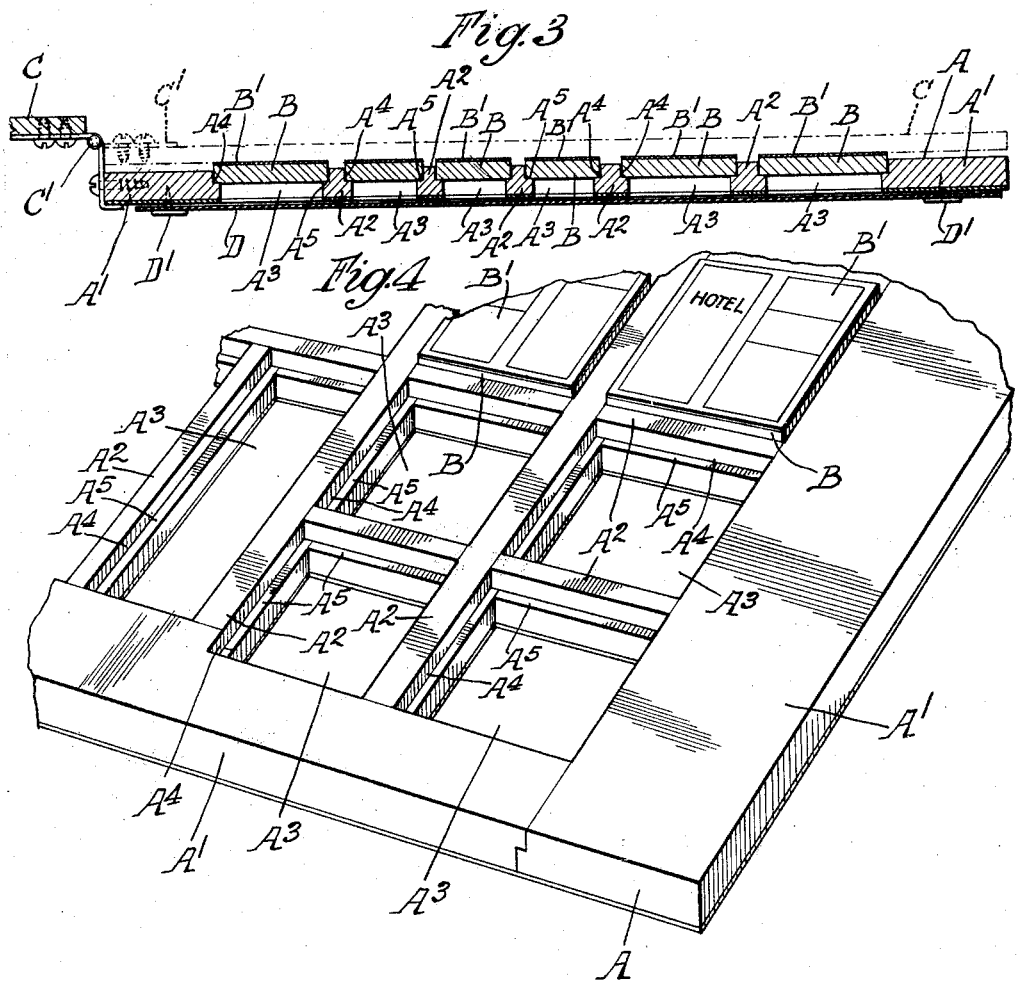
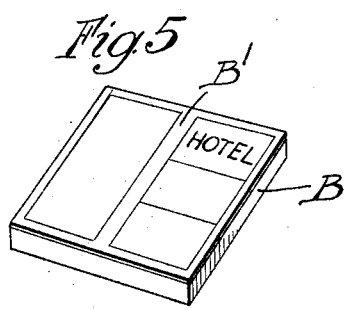
Inventor
Edward S. Skindzier
by Parker & Carter
Attorneys.

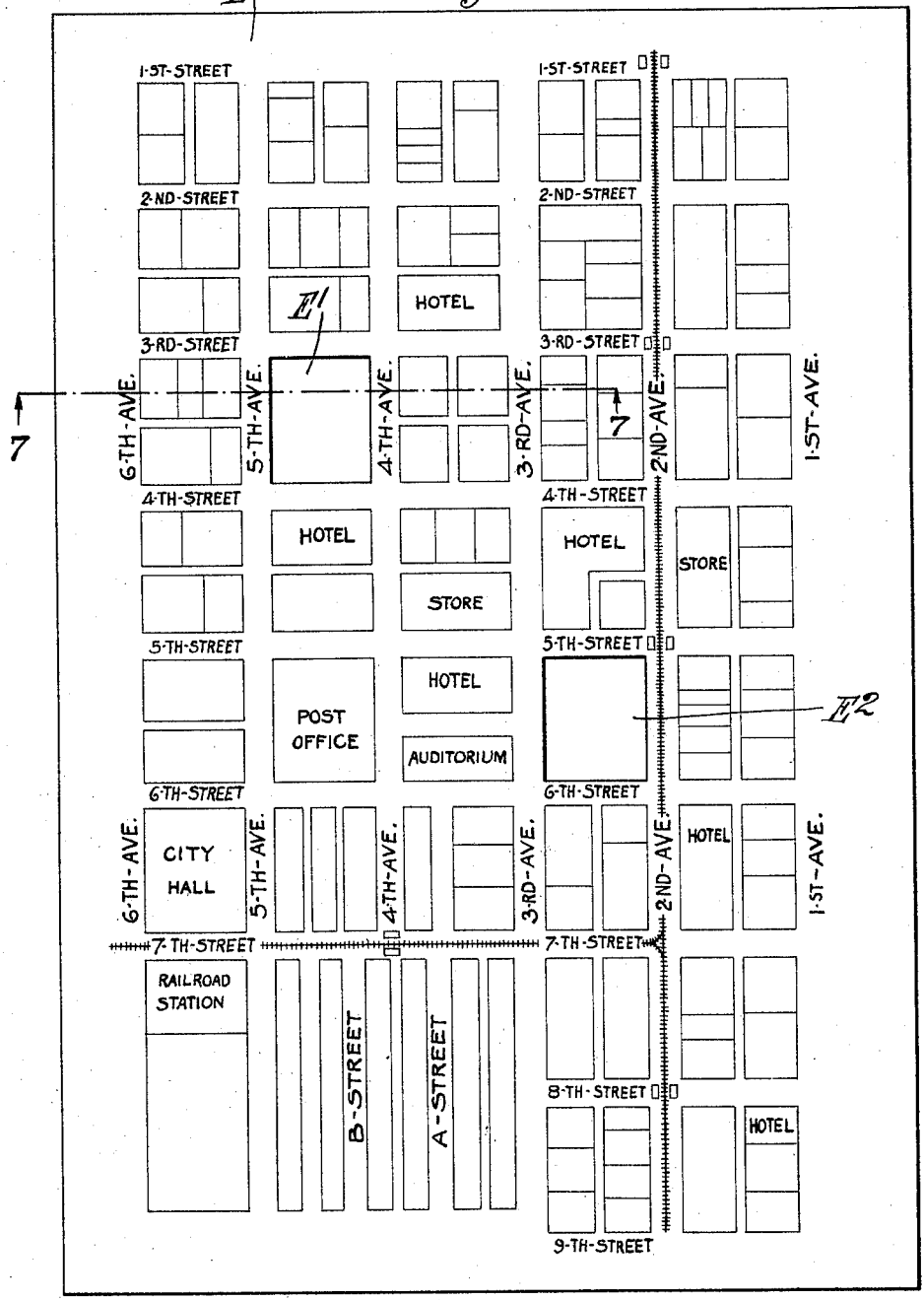

June 13, 1933.  E. S. SKINDZIER  1,913,640
CHART
Filed Sept. 3, 1932   5 Sheets-Sheet 5
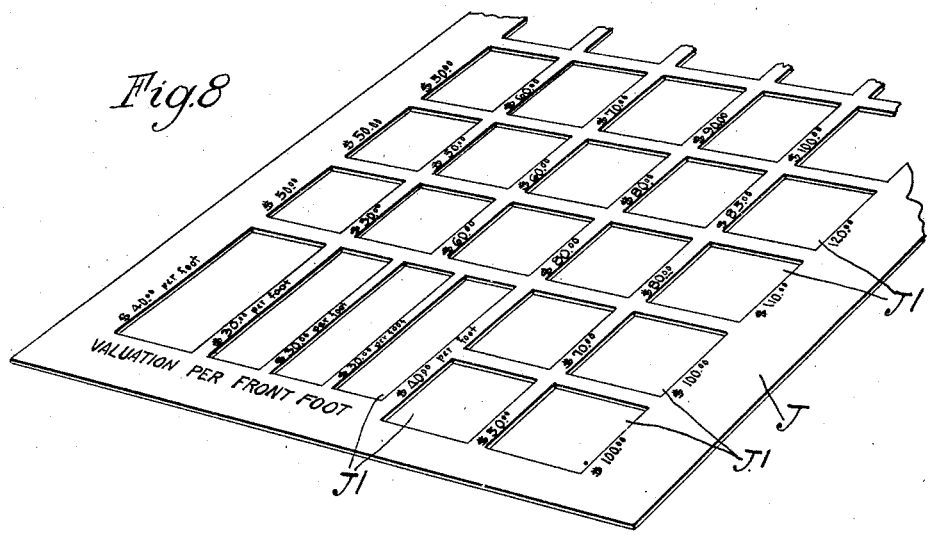
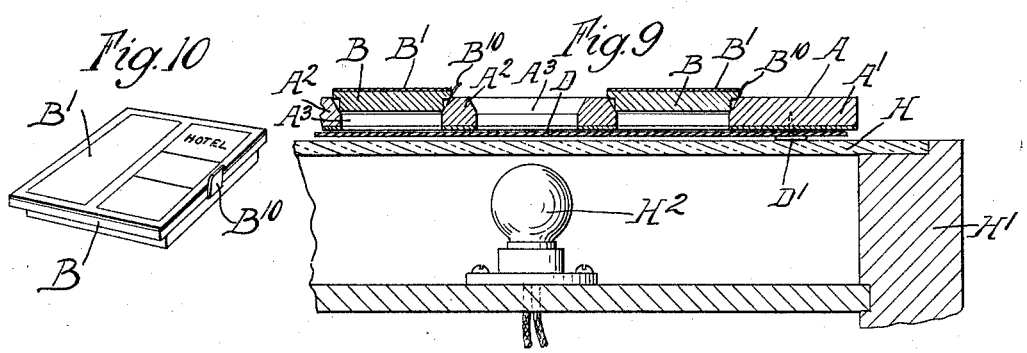
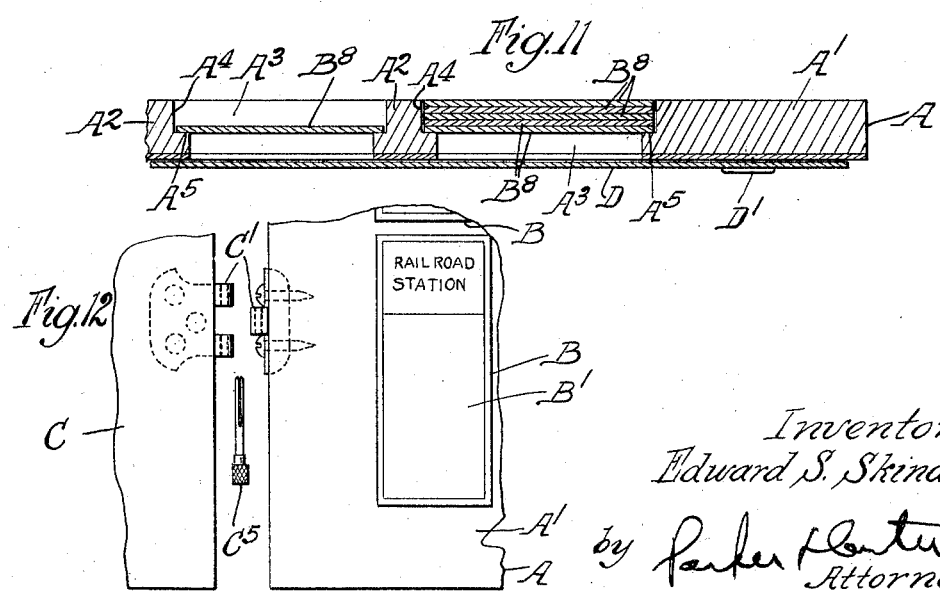
Inventor
Edward S. Skindzier
by Parker & Carter
Attorneys.

Patented June 13, 1933

1,913,640

UNITED STATES PATENT OFFICE

EDWARD S. SKINDZIER, OF CHICAGO, ILLINOIS

CHART

Application filed September 3, 1932. Serial No. 631,637.

My invention relates to an adaptable and adjustable chart board or mechanical map to be employed in bringing to light and developing statistical data and information in order to clarify real estate problems and analysis.

Outstanding among the several novel uses to which this new idea in map construction lends itself is the facility with which one or more areas under discussion and analysis may be brought out in vivid comparison with the remaining portion of a map or with any specified locality or localities.

A particularly pertinent application of my apparatus is an almost automatic digging into the facts of comparative land values, revealing at a glance the actual situation, just as it is, freed absolutely of all extraneous detail. It is, however, also adaptable to a wide variety of other uses in the field of real estate problems in general, in determining the special merits of any given locality as the scene of an advertising campaign, in the educational field, and as an interesting and instructive toy for children.

The mechanical map may show any area to be given special analysis and consideration. It is herein shown as a city area, with its streets forming the general frame work, and with insets carrying topographical detail, or accurately placed city buildings in their respective blocks in the frame formed by the streets.

The apparatus includes a number of carefully prepared maps each setting forth a particular phase of a problem. These maps are a definite and important part of the scheme as a whole and their use in conjunction with the mechanical map, with its insets which may be taken out at will to bring into relief any point to be illustrated and emphasized, is an important part of my method of fact-finding.

These separate maps which are to be used with the chart board or mechanical map may for example set forth the result of any special survey that may have been made for use in clarifying and determining values. I may employ a map showing all the buildings in a given area of from three to five stories in height, another one showing all buildings of from six to ten stories in height, etc. Another may show all the fire-proof buildings and another all the non-fire-proof buildings. Another may show the location of all restaurants, lunch-counters, and other eating places, and another the location of all theaters and places of amusement, another the night use of land, and another a comprehensive tabulation of actual sales values etc. All of these and others carrying facts of value in forcing home arguments to logical conclusions may be used as underlays for the mechanical map with its insets each in itself the map of a section of the locality being studied or of a city block.

In the apparatus herein shown the underlay map is so drawn that its street intersections and the resulting plats of land or squares coincide with the area of each of the insets so that when placed in juxtaposition the area of the inset is exactly above the area of the underlay. When the underlay is placed in position beneath the mechanical map it may be lighted from below, as by electric bulbs. When one or several of the insets are removed the area of the underlay thus exposed carrying its special set of facts is thrown into sharp contrast to the facts as tabulated on the surface of the insets that have been left in place.

In carrying on work of this nature many maps are required for the underlays with consequent expense for photostatic forms on which to bring out desired facts, and just here another use of the mechanical map presents itself. By removing all of the insets and placing a blank piece of heavy paper under the resulting frame work a perfect form map may be made simply by tracing with a pencil the inner outline of each one of the squares. Maps of only certain sections of the entire map may also be similarly produced as required.

In addition to the underlay maps, overlays for the streets as shown in the frame work of the mechanical map may also be used, these carrying, for example, front footage values varying with each overlay as to the year of the appraisal or as to sales values. Transportation facilities may also be thus brought out, or other data of value in making comparisons.

I illustrate my invention more or less diagrammatically in the accompanying drawings wherein—

Figure 3 is a section on the line 3—3 of Figure 1;

Figure 4 is a perspective view;

Figure 5 is a detail of a form of inset;

Figure 6 is a plan view of a portion of a variant device;

Figure 7 is a section on the line 7—7 of Figure 6;

Figure 8 is a view of an overlay;

Figure 9 is a section similar to Figure 3, including slight variations of my device;

Figure 10 is a view similar to Figure 5 showing a variant form of inset;

Figure 11 is a section similar to Figure 3 illustrating a variant form of inset; and Figure 12 is a detail showing a removable hinge arrangement.

Like parts are indicated by like symbols throughout the specification and drawings.

Referring first to the form of Figures 1 to 5, A generally indicates a base or frame portion which may be of any material, for example, of wood. It may include, for example, a surrounding frame of wood member $A^1$, the space within the frame being filled by a plurality of transverse members $A^2$ which outline and define spaces $A^3$. These spaces are herein shown as generally rectangular in contour since in this particular exemplification of my device it is shown as applied to a portion of a city in which the city blocks are rectangular. It will be understood, however, that any other suitable form or shape created by the transverse members $A^2$ may be employed as necessary to meet conditions and to support the insets B which accurately picture the problem under consideration.

As will be clear from Figures 3 and 4 the walls which define the spaces $A^3$ are upwardly recessed as at $A^4$ to leave intermediate ledges $A^5$, preferably of uniform height for the entire apparatus.

Figure 1:
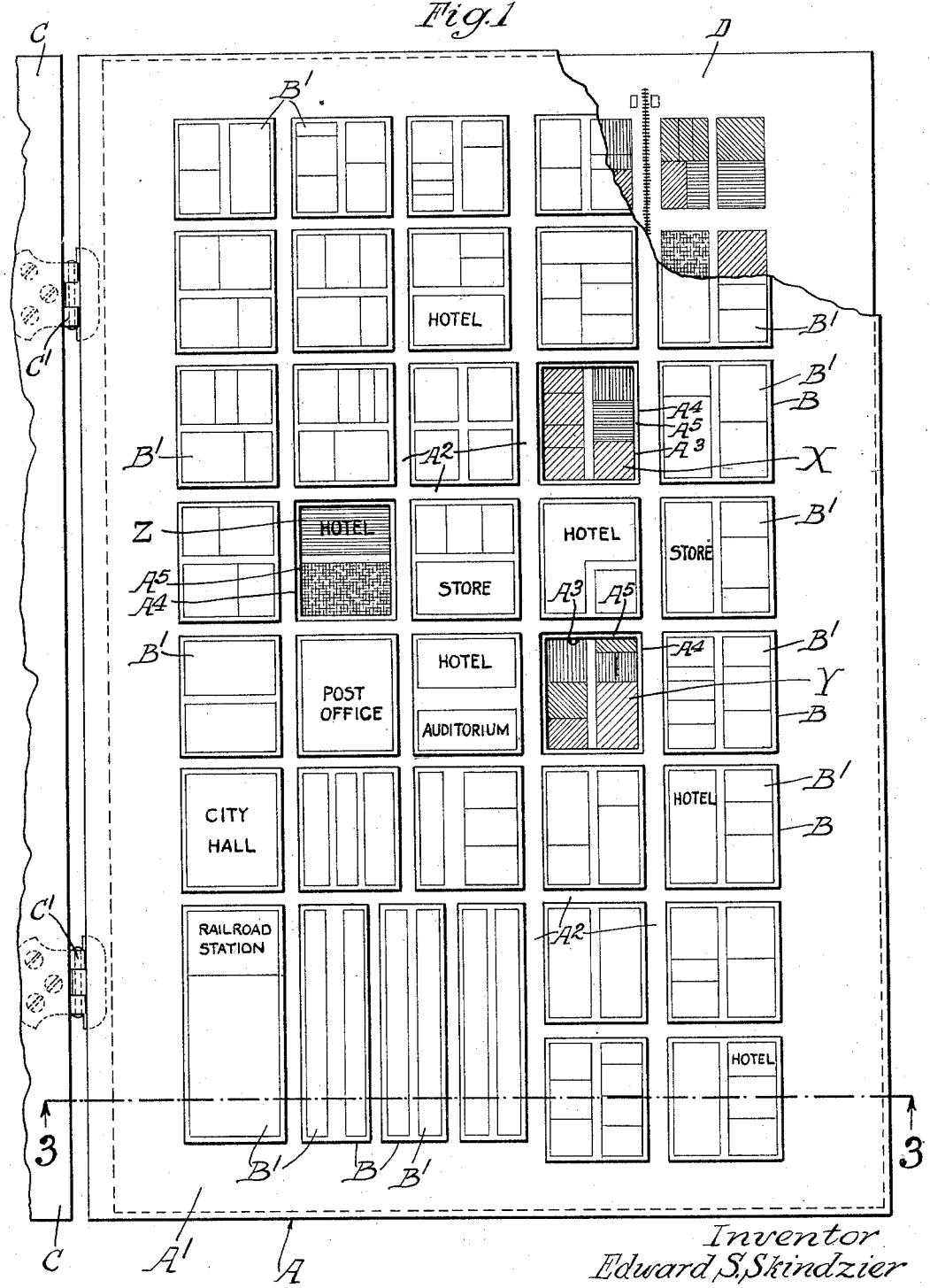
Figure 1 is a plan of my device with parts broken away.

Fitting in the spaces $A^3$ and conforming to the shape thereof and proportioned to rest on the ledges $A^5$ are the inset blocks B of wood, fiber or of any other suitable material. In the form of Figures 1 and following, these insets B are provided with a top layer $B^1$, which may be of paper, each of which represents a portion of the map of a city. Recessed insets may be substituted, as in Figures 9 or 10, thus doing away with the recessed effect, and insets with a loop of cord $B^{10}$ to serve in lifting them out can be devised. The cross sections representing the streets may be flush with the insets themselves, as shown in Figure 11, thus presenting a perfectly plain surface when all insets are in or they may be considerably higher as in Figures 3 or 9, thus setting off the streets in relief. These insets may be very thin so that several may be utilized to fill each of the spaces $A^3$ from the bottom of the ledge $A^5$ to the surface of the map at or just below the level of the cross pieces $A^2$ representing the streets. These are indicated as $B^8$ in Figure 11. If so contrived each of the thin insets for any particular space $A^3$ may have a map developing a special phase of a study on each of its sides thus increasing markedly the number of studies that may be brought into play for each of the spaces of the underlay when placed in position under the mechanical map. Some of these thin insets may be coated with silicate so that erasures may easily be made and new material, as required, written across the face of the inset.

In the particular exemplification of my invention herein shown, the members $A^2$ roughly define the streets and the portions $B^1$ of the insets B each represent a city block bounded by streets. The buildings, alleys and the like are represented on the portions $B^1$ as shown in Figures 1, 5 and 10. While I have shown a separate surfacing $B^1$ it will be understood, of course, that the map or representative material may be impressed directly upon the insets B. In the present form the bottoms of the insets B are shown as blank, but they may also carry information and detail pertinent to the matter in hand.

C indicates a lid or cover hinged as at $C^1$ to the frame $A^1$. It is shown in Figure 3 in dotted line position when closed, in which position it is effective to hold the insets B in place. The lid or cover may be fitted with a hinge that will slip out, as by the use of the removable hinge pin $C^5$ of Figure 12, so that the cover may be removed entirely and set to one side, in this way saving desk space when the mechanism is being used for demonstration. Any suitable latching or fastening means may be employed.

Figure 2:
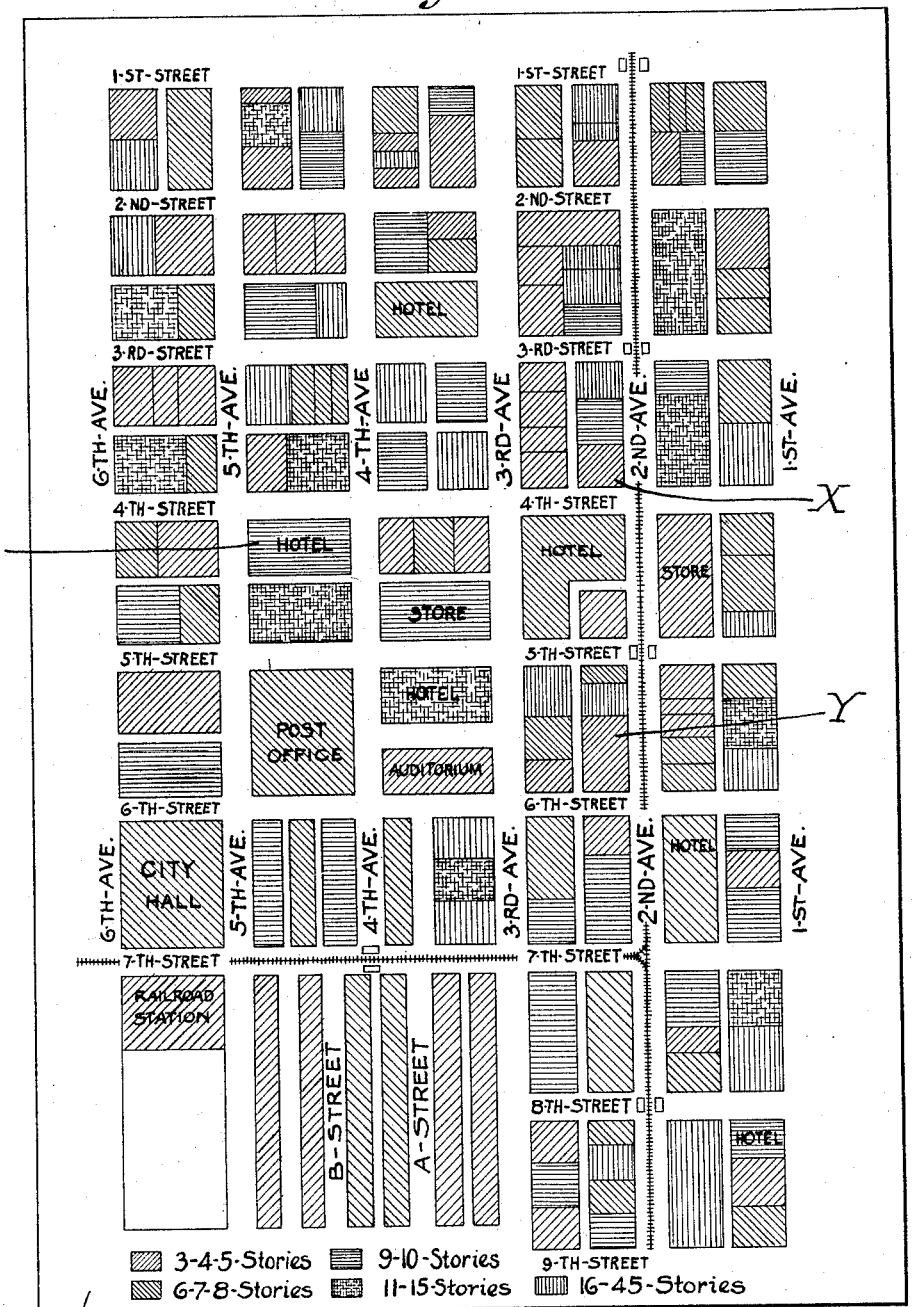
Figure 2 is a view of a map or chart underlay.

D indicates a map or chart, the underlay heretofore mentioned as shown for example in Figure 2 in which the streets and city blocks conform to the map formed by the members $B^1$ in association with the cross members $A^2$. Any suitable means may be employed, such as pins or thumb tacks $D^1$, for holding the map D in proper and constant register with the apertures $A^3$ so that each city block of the underlay map D will be fixed in coincidence with the aperture beneath the member or inset B which conforms to the same general outline. It will be understood that a plurality of the maps or charts D may be drawn and made use of each indicating some particular datum, proof, evidence, opinion, analysis, computation, thought, appraisal, value or any information or illustration that may substantiate or develop an estimate, opinion, thought, error, fact, etc.

Assume that the map formed by the members B¹ as shown in Figure 1 represents merely the streets and the lot or building lines. The map or underlay D may be classified to indicate the characteristics of the buildings, for example in coloring or in cross-hatching the buildings of various heights. In Figure 2 I have shown the underlay map D as representing five different height classifications of buildings. Thus a user of the map, for example, can tell at a glance which are the high buildings and which the low and where in the whole area the high buildings are most in evidence. Assume that the user is interested in comparing the height of buildings in a plurality of areas, he will thrust under the member A the underlay D and will then lift up or remove the particular insets B which overlie the areas in which he is interested. In Figure 1 three of the insets have been removed leaving exposed three city blocks from the underlay D. The user can inspect his underlay one block at a time by successively lifting up the insets and can test its values and special features in its relation to the remaining insets in the board, or he may compare two or more areas, as is being done with the device in the condition in which it is shown in Figure 1.

As an illustration of the employment of my device, assume that the user is interested in determing whether or not a given block or lot is justly appraised. He may employ an underlay D expressed in terms of tax assessment or valuation per front foot or per square foot. He may then determine the valuation of the lot he is interested in and may pick other areas where a similar, higher or a lower valuation is expressed. Assume that he feels that the area indicated as X in Figure 1 is faultily assessed or appraised, he may make a comparison with the area Y in Figure 1 which has the same valuation and an area Z which may have a considerably lower valuation. The corresponding areas of Figure 2 enable a comparison in building heights to be made. The comparison, in fact, is forced on one's attention. Another map or underlay D may be substituted indicating or classifying the same area in terms of fire-proof and non-fire-proof buildings. Another underlay may be employed illustrating congestion of traffic. Other underlays may be employed illustrating the nature of the use to which the property is put, indicating wholesale or retail stores, or indicating theaters, restaurants, or illustrating the sales value of the property. Still others may be made use of to show rental value, frontage value, improved value of land, highest use of land, computations, calculations, tables, etc. Other maps may be drawn and employed reflecting corner valuations, obsolescence, increments and decrements and specifically to develop any opinion, thought, logic, or set of facts, estimates, analyses, etc. The user may first tabulate the height of buildings and other characteristics of the particular two or more areas he is comparing. He may then by removing other surrounding inset blocks B as he examines the succession of underlays D determine and tabulate the intensity of use of the property or areas in which he is primarily interested.

In a final analysis the user may remove the inset blocks which surround the particular block or blocks (which are represented in the underlay) he is studying and substitute another set of insets B, each member of which may portray some particular factor, either positive or negative, to be considered in his study or comparison. This method of surrounding a block or blocks with such factors enables the user not only to sum up all the reflections which have been the product of his study to this point, but it gives him at a glance a clear picture of the comparative values of the areas he is studying and a working base for a formula for his own estimate of a true valuation.

Assume that two areas under consideration have an identical valuation put on them by the appraisers, if one of these areas is in a zone of intensive use with buildings of from 16 to 45 stories in height, and if it is also in an area of heavy traffic and filled with retail stores, department stores and an accumulation of positive factors that express an enhancement of property values then it would be logical that it should be evaluated or appraised at a high rate. But if the user finds that a similar area a few streets away has the same valuation even though it may be in an area of low buildings, light traffic and less intensive use which reflect negative factors depreciating in their effect on property values then there is a serious discrepancy, a warping of judgment and, apparently, a great injustice in the valuation as appraised. This discrepancy can at once be made transparently clear by means of the device herein described and also can be unquestionably and graphically demonstrated, for example, before a court or a tax hearing. In other words, I provide a very simple, easily understandable method or process for bringing out and forcing comparisons, of pitting negative factors against positive factors to bring out the inherent merits or demerits of any given locality, of establishing an explainable and workable basis on which to justify sales values, which is also of particular value for demonstrating to a judge, a jury, a board, tax assessors or the like the faults and injustices in appraisals and assessments as they may appear.

While I find the stout frame with removable insets an efficient and practical solution of my problem I may employ as a substitute the members shown in Figures 6 and 7 namely a series of charts E giving the general physical layout such as is shown in Figure 1, but provided with cut out spaces $E^1$, $E^2$, and the like. These charts E are to be used in the same manner as the mechanical map itself, that is, they are to be placed over the underlays to develop in their own way situations that are to be reviewed and studied.

This variation of the device lacks the flexibility of that portion as shown and explained in Figure 1 since a separate cut out is necessary for the comparison of each combination or variation of areas to be compared and studied. On the other hand, if the user is determining and illustrating the accuracy or error of the tax valuation on a single given area, and wishes to compare it with say two or three or four other areas, then only two or three or four of the apertured charts E will be necessary, and they are lighter and take up less space than the larger and heavier mechanical map.

It will be realized that whereas I have described and shown a practical and operative device, nevertheless many changes might be made in the size, shape, number and disposition of the parts without in any way departing from the spirit of my invention. I therefore wish my description and drawings to be taken as in a broad sense illustrative and diagrammatic rather than as limiting me to my specific showing. In particular, whereas I have illustrated my invention largely in connection with appraisal values and tax valuations in a big city, it may be employed in connection with the sale of real estate or in connection with the study of the industrial or commercial characteristics of any city, no matter what the size, or of any other area. It may be used in geographical surveys or in geological studies, for example, in comparing the subsoil resources of any given area, or it may be used to demonstrate the most effective arrangement of shrubbery, of the planting of trees and of the placing of buildings on an estate.

My apparatus may be set up and demonstrated in a number of ways. I may employ for example the board shown in Figures 1, 3 and 4. As above stated the cover C may be removed by removal of the hinge pins $C^5$. I may set the board on any suitable support, for example the transparent or translucent member H supported in any suitable frame $H^1$ and I may employ any suitable light source $H^2$ for illuminating the underlays which are preferably of translucent material. Or the board A may be laid flat on a desk or sit up against a wall. I may if I wish employ overlays J as shown in Figure 8, such overlays being provided with apertures $J^1$ aligning with and conforming in shape and size to the apertures $A^3$ of the board A.

I claim:

1. In an apparatus for the graphic demonstration of information, a map body having formed therein a plurality of apertures, removable insets in said apertures carrying each a portion of the map of the map body, and one or more underlying maps provided with areas adapted for alignment with said apertures, said areas carrying material relating to the map of the map body.

2. In an apparatus for the graphic demonstration of information, a map body having formed therein a plurality of apertures, removable insets in said apertures carrying each a portion of the map of the map body, and one or more underlying maps provided with areas adapted for alignment with said apertures, said areas carrying material relating to the map of the map body, and means for holding said underlying maps in relation to said map body.

3. In an apparatus for the graphic demonstration of information, a map body having formed therein a plurality of apertures, removable insets in said apertures carrying each a portion of the map of the map body, and one or more underlying maps provided with areas adapted for alignment with said apertures, said areas carrying material relating to the map of the map body, there being a plurality of removable insets for the individual apertures of the map body, said insets carrying on their exposed surfaces different map material relating to the same area.

4. In an apparatus for the graphic demonstration of information, a map body having formed therein a plurality of apertures, removable insets in said apertures carrying each a portion of the map of the map body, and one or more underlying maps provided with areas adapted for alignment with said apertures, said areas carrying material relating to the map of the map body, said underlying maps being translucent, and means for illuminating the underside of said underlying maps in alignment with the apertures of the map body.

5. In an apparatus for the graphic demonstration of information, a map body having formed therein a plurality of apertures, removable insets in said apertures carrying each a portion of the map of the map body, said map illustrating a predetermined characteristic or characteristics in relation to the area it covers, and one or more underlying maps provided with areas adapted for alignment with said apertures of the map body, said underlying maps showing the same area as the map body but carrying different information relating thereto.

6. In an apparatus for the graphic demonstration of information, a map body having formed therein a plurality of apertures, removable insets in said apertures carrying each a portion of the map of the map body, said map illustrating a predetermined characteristic or characteristics in relation to the area it covers, and one or more underlying maps provided with areas adapted for alignment with said apertures of the map body, said underlying maps showing the same area as the map body but carrying different information relating thereto, there being a plurality of removable insets for the individual apertures of the map body, said insets carrying on their exposed surfaces different information relating to the area of the map they cover.

7. In an apparatus for the graphic demonstration of information, a map body having formed therein a plurality of apertures, removable insets in said apertures carrying each a portion of the map of the map body, there being a plurality of said removable insets for the individual apertures of the map body, said insets carrying on their exposed surfaces different map material relating to the map of the map body.

8. In an apparatus for the graphic demonstration of information, a map body having formed therein a plurality of apertures, removable insets in said apertures carrying each a portion of the map of the map body, said map illustrating a predetermined characteristic or characteristics in relation to the area it covers, there being a plurality of removable insets for the individual apertures of the map of the map body, said insets carrying on their exposed surfaces information relating to the area of the map they cover other than that shown on the map body.

9. In an apparatus for the graphic demonstration of information, a map body having formed therein a plurality of apertures, removable insets in said apertures carrying each a portion of the map of the map body, and one or more overlying maps provided with apertures adapted for alignment with the apertures of the map body, said overlying maps carrying material relating to the map of the map body.

10. In an apparatus for the graphic demonstration of information, a map body having formed therein a plurality of apertures, removable insets in said apertures carrying each a portion of the map of the map body, and one or more overlying maps provided with apertures adapted for alignment with the apertures of the map body, said overlying maps carrying material relating to the map of the map body, there being a plurality of said removable insets for the individual apertures of the map body, said insets carrying on their exposed surfaces different map material relating to the map they cover.

11. In an apparatus for the graphic demonstration of information, a map body having formed therein a plurality of apertures, removable insets in said apertures carrying each a portion of the map of the map body, said map illustrating a predetermined characteristic or characteristics in relation to the area it covers, and one or more overlying maps provided with apertures adapted for alignment with the apertures of the map body, said overlying maps carrying additional material relating to the map of the map body, there being a plurality of removable insets for the individual apertures of the map body, said insets carrying on their exposed surfaces different information relating to the map of the map body.

12. In an apparatus for the graphic demonstration of information, a map body having formed therein a plurality of apertures, removable insets in said apertures carrying each a portion of the map of the map body, and one or more underlying maps provided with areas adapted for alignment with said apertures, said underlying maps carrying material relating to the map of the map body and one or more overlying maps provided with apertures adapted for alignment with the apertures of the map body, said overlying maps carrying different material relating to the map of the map body.

13. In an apparatus for the graphic demonstration of information, a map body having one or more apertures therein, and one or more underlying maps provided with areas adapted for alignment with the aperture or apertures of the map body, said areas carrying information relating to the map of the map body.

14. In an apparatus for the graphic demonstration of information, a map body having one or more apertures therein, said map illustrating a predetermined characteristic or characteristics in relation to the area it covers, and one or more underlying maps provided with areas adapted for alignment with the aperture or apertures of the map body, said underlying maps carrying different material relating to the map of the map body.

15. In an apparatus for the graphic demonstration of information, a map body having formed therein a plurality of apertures and a plurality of removble insets for the individual apertures of the map body, said insets carrying on their exposed surfaces different material relating to the map of area they cover, these insets being interchangeable.

16. In an apparatus for the graphic demonstration of information, a map body having formed therein a plurality of apertures, and one or more underlying maps provided with areas adapted for alignment with said apertures, said areas carrying material relating to the map of the map body, and a plurality of removable insets for the individual apertures of the map body said insets carrying on their exposed surfaces different material relating to the area they cover, these insets being interchangeable.

17. In an apparatus for the graphic demonstration of information, a map body having formed therein a plurality of apertures, one or more overlying maps provided with apertures adapted for alignment with the apertures of the map body, said overlying maps carrying material relating to the map of the map body, and a plurality of removable insets for the individual apertures of the map body, said insets carrying on their exposed surfaces, different material relating to the map of the area they cover, these insets being interchangeable.

18. In an apparatus for the graphic demonstration of information, a map body having formed therein a plurality of apertures, one or more underlying maps provided with areas adapted for alignment with the apertures of the map body, said underlying maps carrying material relating to the map of the map body, and one or more overlying maps provided with apertures adapted for alignment with the apertures of the map body, said overlying maps carrying different material relating to the map of the map body, and a plurality of removable insets for the individual apertures of the map body, said insets carrying on their exposed surfaces different information relating to the map of the map body, these insets being interchangeable.

19. In an apparatus for the graphic demonstration of information, a map body having formed therein a plurality of apertures and removable insets in said apertures, representing each a portion of the map body, said apertures extending entirely through said map body, any material placed beneath said map body being rendered visible by the removal of a given insert.

20. In an apparatus for the graphic demonstration of information, a map body having formed therein a plurality of apertures and removable insets in said apertures, representing each a portion of the map body, said apertures extending entirely through said map body, any material placed beneath said map body being rendered visible by the removal of a given insert, and an additional map positioned beneath said map body and containing areas aligned with said apertures, said areas carrying material relating to but differing from the map of the map body.

Signed at Chicago county of Cook and State of Illinois, this eleventh day of June 1932.

EDWARD S. SKINDZIER.